July 8, 1924.  M. KASSER  1,500,876
EGG CARRIER
Filed April 24, 1920
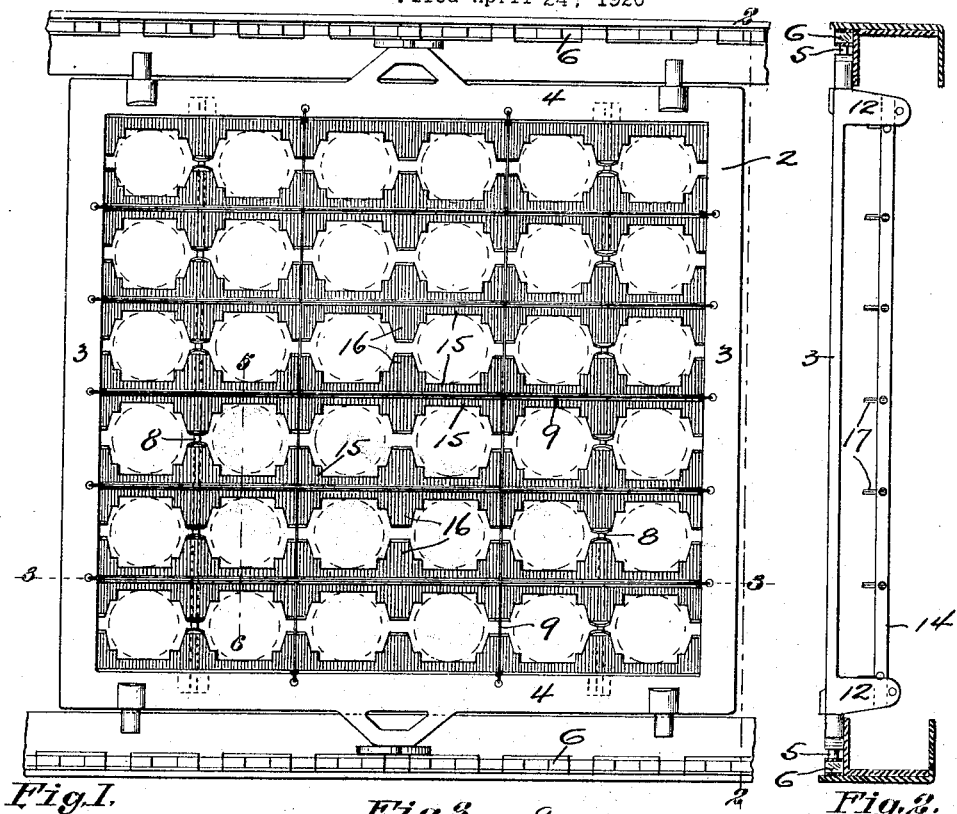
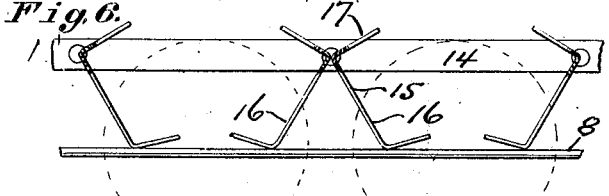
Inventor.
MORRIS KASSER Patented July 8, 1924.

1,500,876

UNITED STATES PATENT OFFICE.

MORRIS KASSER, OF SAN FRANCISCO, CALIFORNIA, ASSIGNOR TO KASSER EGG PROCESS CO., OF SAN FRANCISCO, CALIFORNIA, A CORPORATION OF CALIFORNIA.

EGG CARRIER.

Application filed April 24, 1920. Serial No. 376,239.

*To all whom it may concern:*

Be it known that I, MORRIS KASSER, a citizen of the United States, and a resident of the city and county of San Francisco, State of California, have invented a new and useful Egg Carrier, of which the following is a specification.

The invention relates to devices for releasably carrying eggs or similarly shaped objects for the purpose of subjecting them to treatment and is particularly adapted for use in connection with the egg treating machines shown in my co-pending application for United States Letters Patent Serial No. 376,238, filed Apr. 24, 1920, in which application the egg carrier is shown and described, but not claimed.

An object of the invention is to provide an egg carrier from which eggs may be quickly and automatically discharged.

Another object of the invention is to provide an egg carrier which may be quickly charged with eggs.

The invention possesses other advantageous features, some of which, with the foregoing, will be set forth at length in the following description where I shall outline in full that form of the invention which I have selected for illustration in the drawings accompanying and forming part of the present specification. In said drawings I have shown one form of egg carrier of my invention, but it is to be understood that I do not limit myself to such form, since the invention, as expressed in the claims, may be embodied in a plurality of forms.

Referring to said drawings:

Figure 1 is a plan view of the egg carrier of my invention arranged on a conveyor.

Figure 2 is a cross section of the conveyor and trackway and an end elevation of the carrier, taken on the line 2—2 Fig. 1.

Figure 3 is a cross section of the carrier taken on the line 3—3, Fig. 1.

Figure 4 is a side elevation of the carrier, with the parts in egg-releasing position.

Figure 5 is a cross section taken on the line 5—6, Figure 1 showing the parts in egg-retaining position.

Figure 6 is a similar cross section showing the parts in egg-releasing position.

Figure 7 is a perspective view of a fragment of one of the egg-holding members.

The egg carrier of my invention comprises a frame 2, preferably metallic and rectangular, having end members 3 and side members 4. The frame is provided with suitable means of support, such as the pins 5, which extend into the conveyor chains 6. The side members 4 are provided with depending ears 7, to which are secured rods 8 extending across below the frame for reasons which will hereinafter become apparent. The frame is also provided with cross-wires 9, which lie in the plane of the upper surface of the frame and which constitute a supporting means for the fiber board sheet on which the eggs are disposed, prior to being placed in the carrier.

The end members 3 are provided at their ends with depending ears 12, which form guideways 13 in which the ends of the vertically movable cross-bars 14 are disposed. The bottom of the carrier comprises a plurality of hinged leaves 15 of such shape that a series of egg-holding apertures are formed between each pair of leaves. The adjacent edges of the leaves, which are preferably made of sheet metal, although they may be made of wire or other material, are formed to provide the egg-holding apertures, which are partially separated by the integral alined tongues 16 on the leaves. The leaves are formed with horizontal portions in which the apertures are formed and with vertical portions or ears 17 alined with the tongues, the ears on the adjacent leaves being in contact when the tongues 16 are in the horizontal position, the contacting of the ears serving to hold the tongues in horizontal position. The rods 8 extend across the frame below the tongues and the tongues contact with the rods and are supported thereby.

The apertures between the pairs of leaves are smaller in diameter, when the tongues are horizontal, than the diameter of the eggs, so that the eggs are held in the apertures, and means are provided for increasing the area or for opening the apertures to permit the eggs to fall through the bottom. The leaves are pivoted on the line of the angle between the horizontal and vertical portions, to the cross-bars 14, so that as the cross-bars are moved vertically, the leaves move about their pivots, as shown in Fig. 6, opening the apertures and permitting the eggs to fall through. As the cross-bars are raised, the horizontal portions of the leaves are inclined downwardly, falling back from the egg and removing support from the egg.

In placing eggs in the carrier, a tier of eggs with their supporting fiber board sheet and cellular container are removed from the egg crate and placed on the carrier, the sheet being supported by the wires 9. The sheet is then slipped from under the eggs and they drop into the apertures in the bottom of the carrier. After the eggs have been subjected to the desired treatment, the cross-bars 14 are raised and the eggs released to pass down through the frame.

I claim:

1. An egg carrier comprising a frame, a plurality of egg supporting leaves arranged in pairs in the frame, vertically movable cross-bars in which the leaves are pivoted at their ends and supporting rods disposed below and at right angles to the leaves, movement of the cross bars serving to move the leaves about their pivots.

2. An egg carrier comprising a frame, a plurality of egg supporting leaves arranged in pairs in the frame, the leaves being constructed so that each pair of leaves form a plurality of egg receiving apertures, rods disposed below said leaves and on which said leaves rest, said rods being at right angles to said leaves and vertically movable bars disposed at right angles to the leaves and to which the leaves are pivoted at their ends, the two leaves of each pair being pivoted to each bar at spaced points thereon whereby vertical movement of the bars causes pivotal movement of the leaves to vary the size of the egg receiving apertures.

3. An egg carrier comprising a frame, wires extending across said frame in the plane of the upper surface thereof, a plurality of egg supporting leaves arranged in pairs in the frame below said wires, the two leaves of each pair forming a plurality of egg receiving apertures, vertically movable cross bars in which the ends of the leaves are pivoted, movement of the bars causing movement of the leaves about their pivots and supporting rods disposed below the leaves and on which the free ends of the pivoted leaves bear as the cross bars are moved.

In testimony whereof, I have hereunto set my hand.

MORRIS KASSER